US012330325B2

(12) United States Patent
Gerst

(10) Patent No.: US 12,330,325 B2
(45) Date of Patent: Jun. 17, 2025

(54) FROZEN LIQUID CONTAINER OPENING SYSTEM

(71) Applicant: Karen Gerst, Wentzville, MO (US)

(72) Inventor: Karen Gerst, Wentzville, MO (US)

(*) Notice: Subject to any disclaimer, the term of this patent is extended or adjusted under 35 U.S.C. 154(b) by 218 days.

(21) Appl. No.: 18/121,956

(22) Filed: Mar. 15, 2023

(65) Prior Publication Data

US 2024/0308095 A1 Sep. 19, 2024

(51) Int. Cl.

*B26D 1/04* (2006.01)
*B26D 5/10* (2006.01)
*B26D 7/00* (2006.01)
*B26D 7/26* (2006.01)

(52) U.S. Cl.

CPC ................. *B26D 1/04* (2013.01); *B26D 5/10* (2013.01); *B26D 2007/0018* (2013.01); *B26D 2007/2685* (2013.01)

(58) Field of Classification Search

CPC ... B26D 1/04; B26D 5/10; B26D 3/16; B26D 3/166; B26D 3/169; B26D 7/00; B26D 7/18; B26D 2007/189; B26D 2007/0018; B26D 2007/2685; B67B 7/00

USPC ............................................................ 30/278

See application file for complete search history.

(56) References Cited

U.S. PATENT DOCUMENTS

| | | | | |
|---|---|---|---|---|
| D298,210 | S | 10/1988 | Hutson | |
| 5,555,624 | A | 9/1996 | McCracken | |
| 5,740,610 | A | 4/1998 | Ayer | |
| 6,807,737 | B1 | 10/2004 | Davia | |
| 7,073,264 | B2 | 7/2006 | Votolato | |
| D558,554 | S | 1/2008 | Carbonaro | |
| 7,506,578 | B2 * | 3/2009 | Georgopoulos | B26D 1/08 83/167 |
| 10,099,395 | B2 | 10/2018 | Ferreira | |
| 2006/0156553 | A1 | 7/2006 | Ensenat Alvarez | |
| 2006/0236552 | A1 * | 10/2006 | Giles | B67B 7/20 30/367 |
| 2008/0083301 | A1 * | 4/2008 | Messina | B65F 1/12 81/3.25 |
| 2011/0232103 | A1 | 9/2011 | Sendel | |

FOREIGN PATENT DOCUMENTS

| | | |
|---|---|---|
| CA | 2820690 | 1/2014 |

* cited by examiner

*Primary Examiner* — Phong H Nguyen

(57) ABSTRACT

A frozen liquid container opening system for opening an end of a package containing a frozen liquid includes a pouch being elongated and having an upper end and a lower end. The pouch has the frozen liquid therein and is sealed to retain the frozen liquid therein. An opener is engaged by a user to facilitate opening the upper end of the pouch. A mount is coupled to the housing and removably mounts to the exterior of a refrigerated container.

6 Claims, 8 Drawing Sheets

FROZEN LIQUID CONTAINER OPENING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to package opener and more particularly pertains to a new package opener for opening an end of a package containing a frozen liquid.

(2) Description of Related Art Including Information Disclosed Under 37 CFR 1.97 and 1.98

The prior art relates to package openers and includes a variety of package openers capable of opening a pouch containing a frozen liquid. Known prior art does not include a package opener being mountable to a refrigerator for storing a cut off portion of the pouch.

BRIEF SUMMARY OF THE INVENTION

An embodiment of the disclosure meets the needs presented above by generally comprising a pouch being elongated and having an upper end and a lower end. The pouch has a frozen liquid therein and is sealed to retain the frozen liquid therein. An opener is engageable by a user to facilitate opening the upper end of the pouch. A mount is coupled to the housing and is removably mountable to the exterior of a refrigerated container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
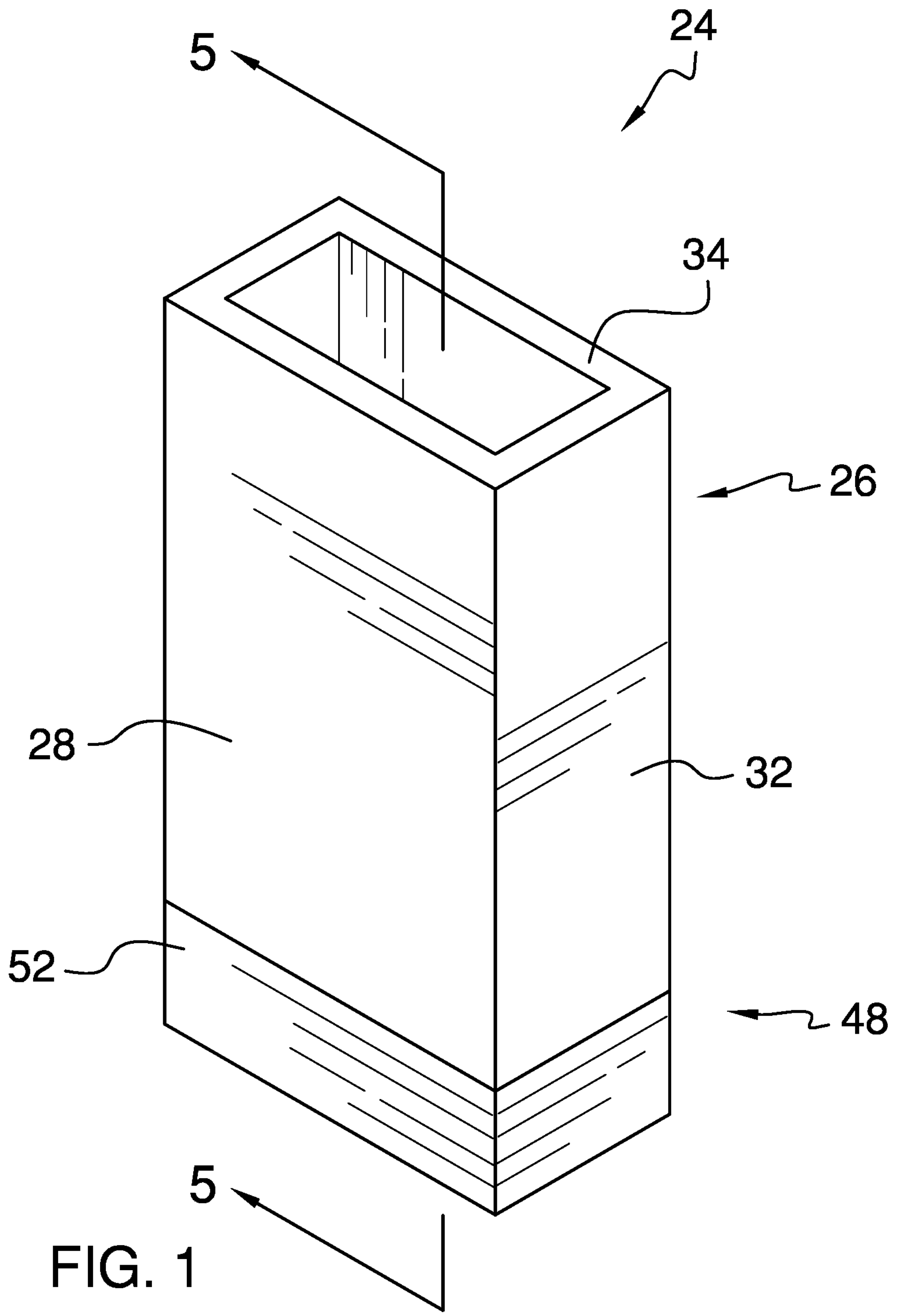
FIG. 1 is a top isometric view of a frozen liquid container opening system according to an embodiment of the disclosure.
Figure 2:
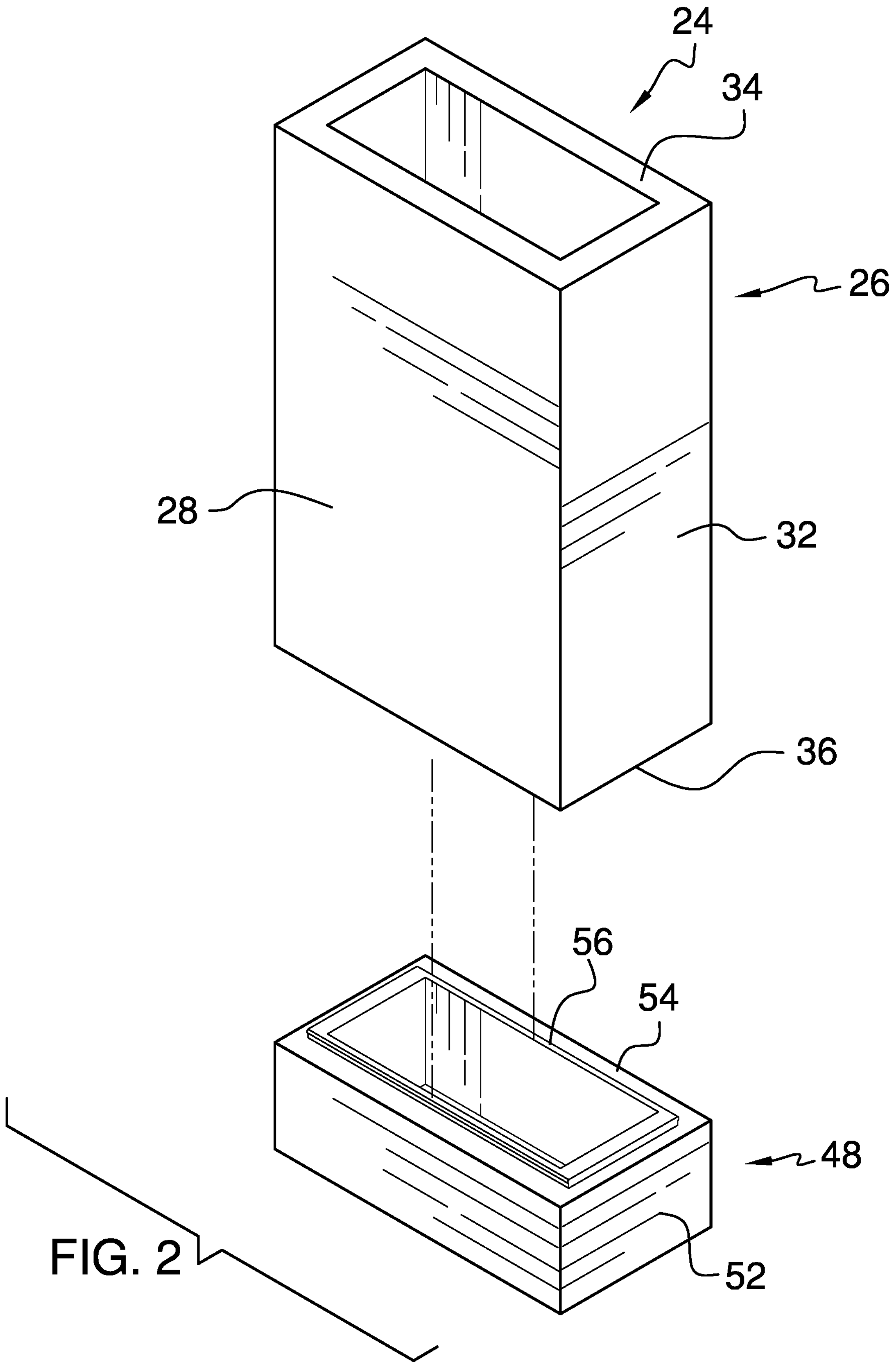
FIG. 2 is an exploded view of an embodiment of the disclosure.
Figure 3:
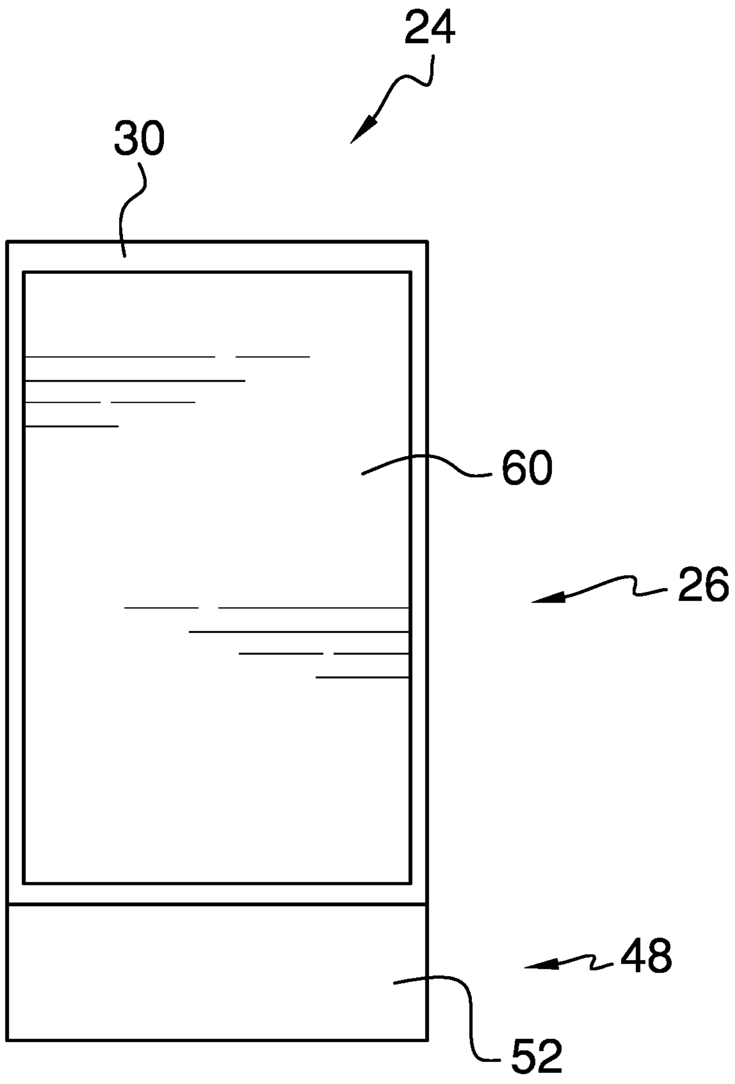
FIG. 3 is a back view of an embodiment of the disclosure.
Figure 4:
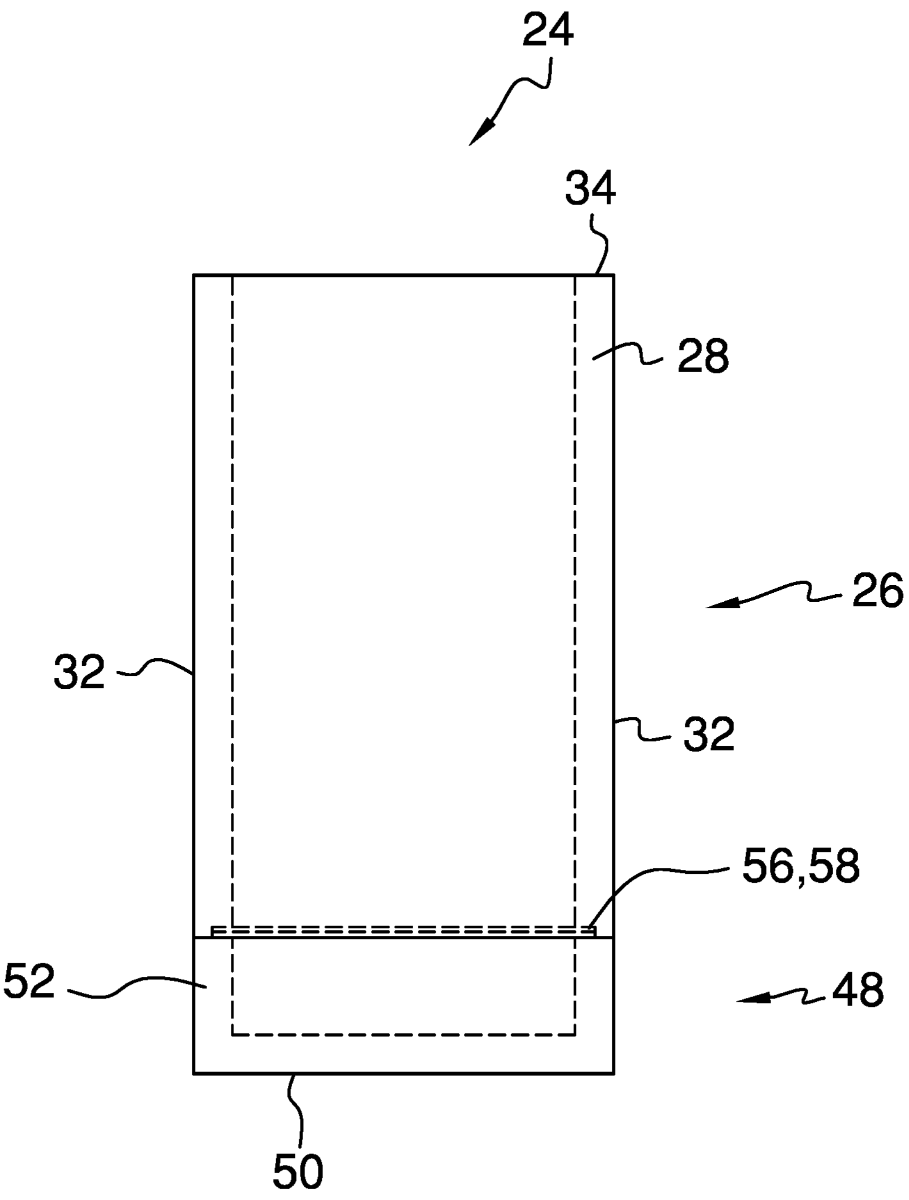
FIG. 4 is a front view of an embodiment of the disclosure.
Figure 5:
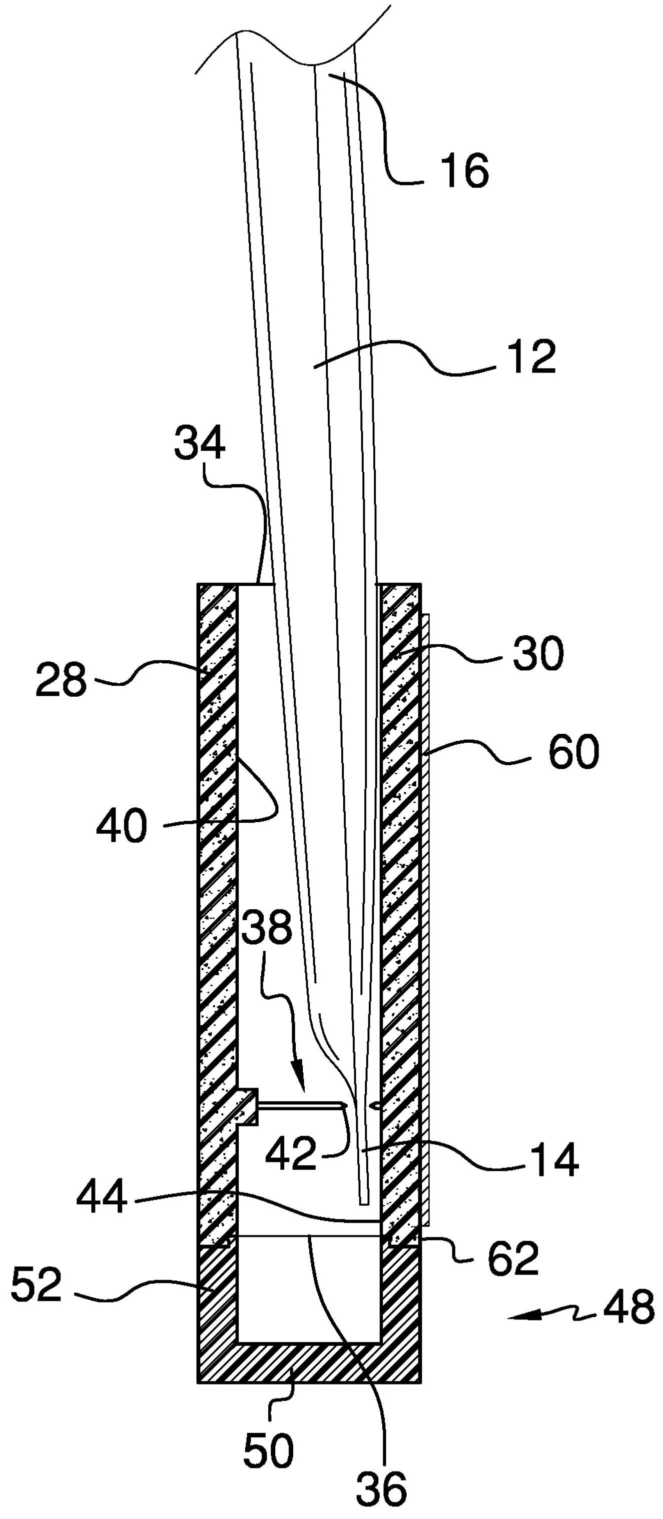
FIG. 5 is a cross-sectional view of an embodiment of the disclosure taken along Line 5-5 of FIG. 1.
Figure 6:
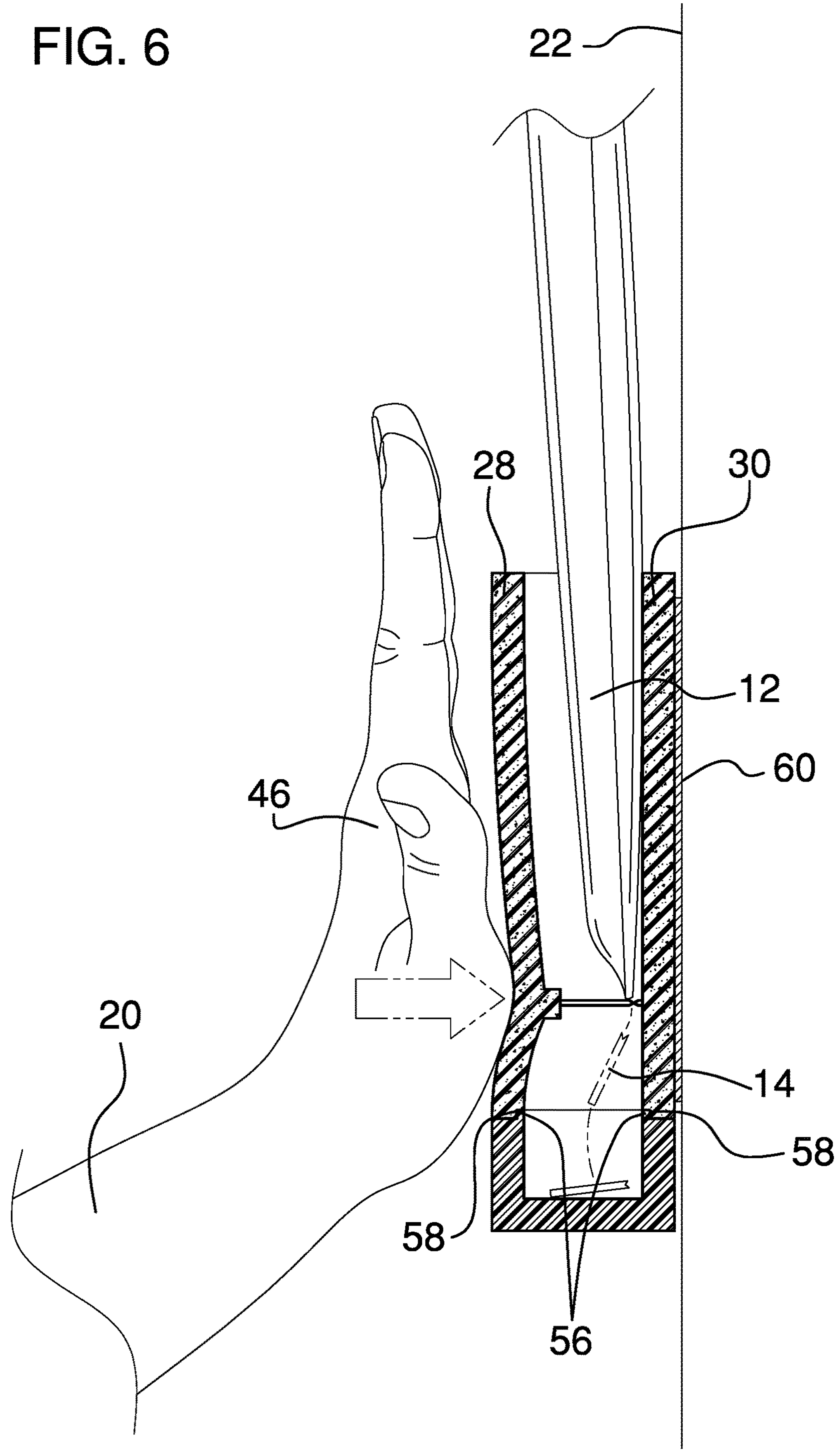
FIG. 6 is an in-use view of an embodiment of the disclosure.
Figure 7:
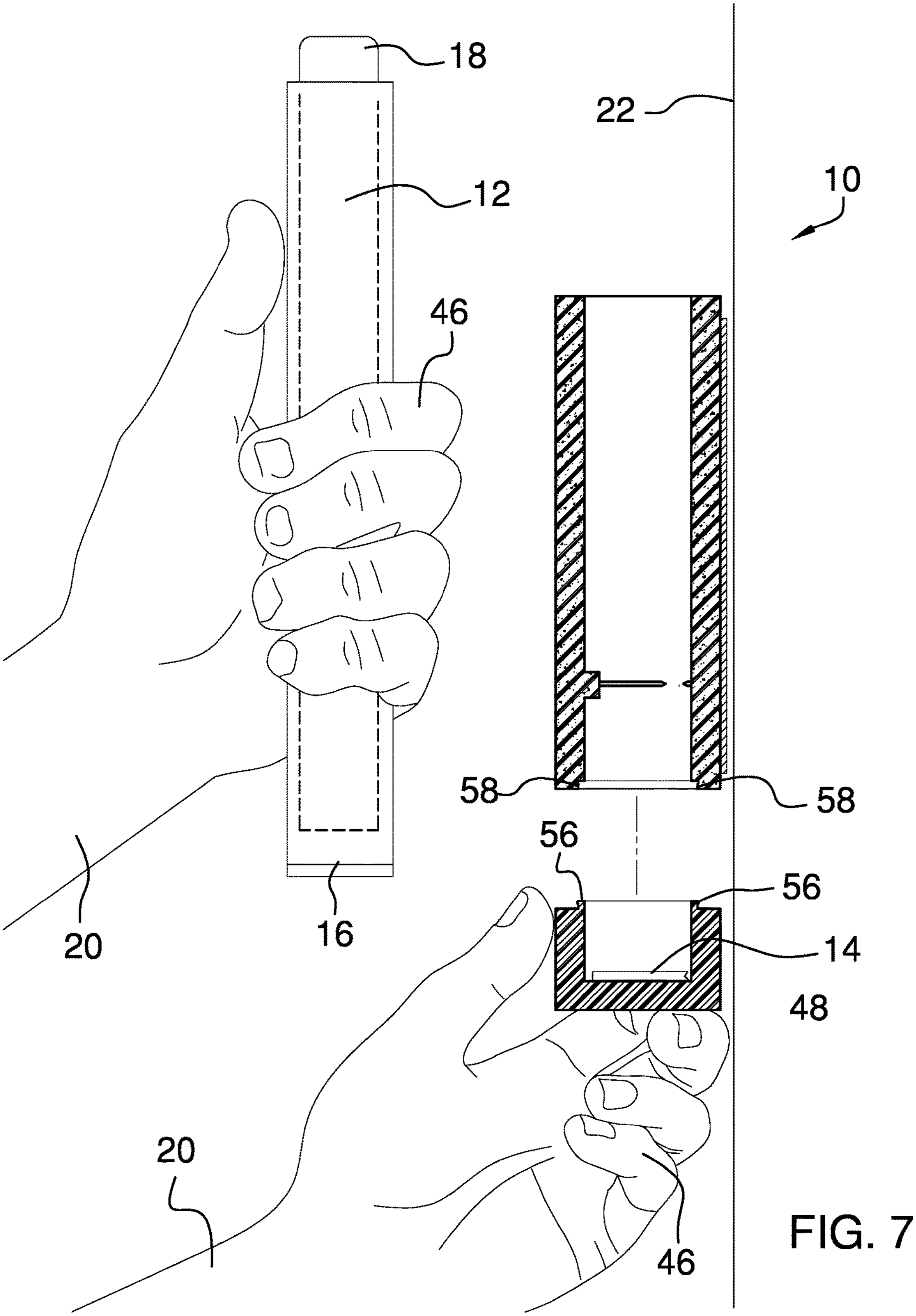
FIG. 7 is an in-use view of an embodiment of the disclosure.
Figure 8:
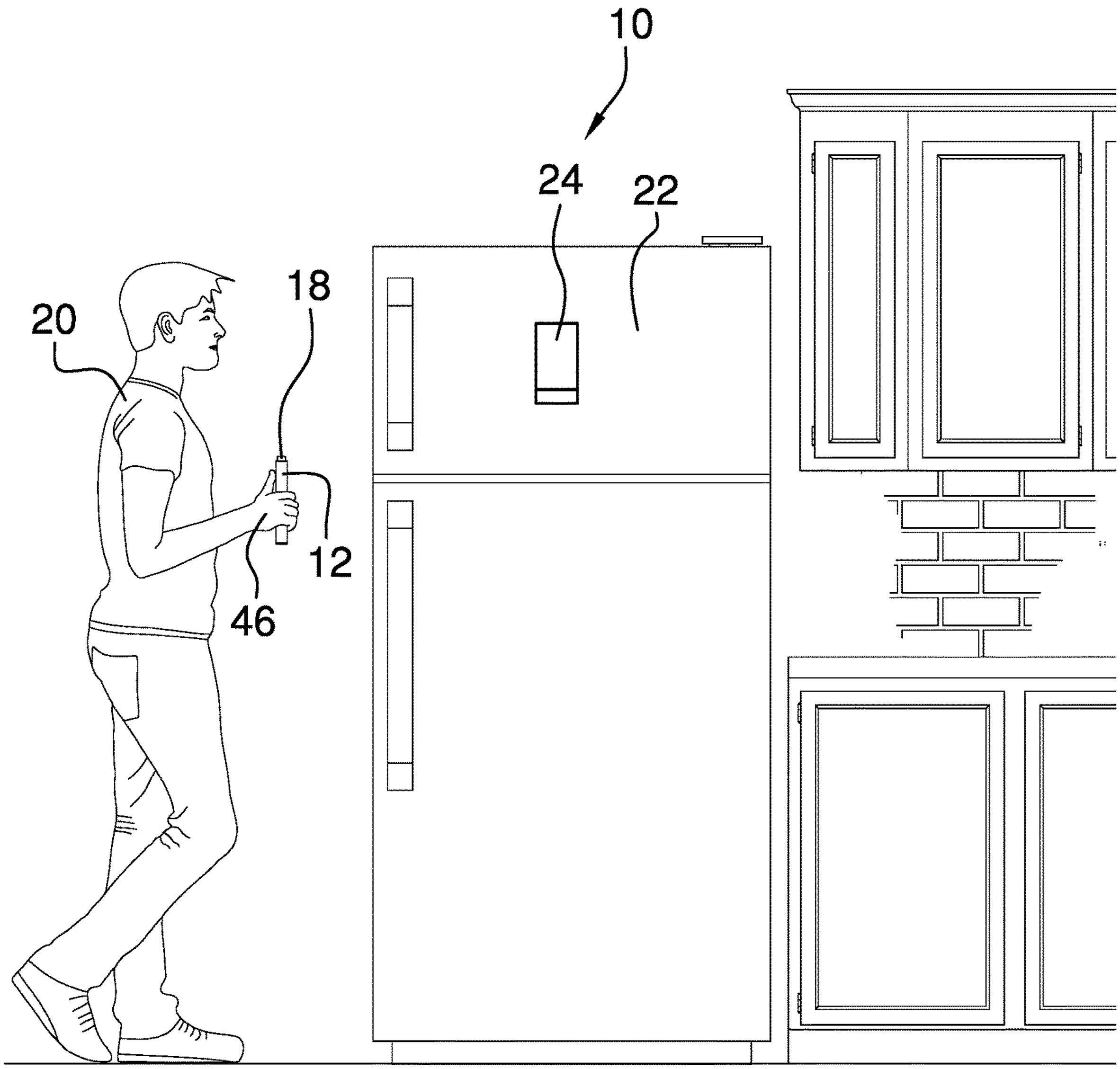
FIG. 8 is an in-use view of an embodiment of the disclosure.

With reference now to the drawings, and in particular to FIGS. 1 through 8 thereof, a new package opener embodying the principles and concepts of an embodiment of the disclosure and generally designated by the reference numeral 10 will be described.

As best illustrated in FIGS. 1 through 8, the frozen liquid container opening system 10 generally comprises a pouch 12 being elongated and having an upper end 14 and a lower end 16. The pouch 12 has a frozen liquid 18 therein and is sealed to retain the frozen liquid 18 therein. The frozen liquid 18 will typically be a flavored treat for a user 20 to eat. The pouch 12 typically comprises a supple material such as silicone. The pouch 12 is normally stored within a refrigerated container 22 such as a refrigerator, a freezer, a portable cooler, or any other conventional refrigerated container 22.

An opener 24 is engageable by a user 20 to facilitate opening the upper end 14 of the pouch 12. The opener 24 includes a housing 26 including a first wall 28, a second wall 30, and a pair of side walls 32. The first 28 and second 30 walls are coupled to the side walls 32 and are positioned perpendicular relative to the side walls 32 wherein the housing 26 forms a rectangular shape. The housing 26 has a top end 34 and a bottom end 36. The top end 34 and the bottom end 36 are open. The housing 26 normally comprises a resiliently flexible material being an elastomeric material such as plastic, silicone, or any other elastomeric material.

A blade 38 is mounted within the housing 26 to sever the upper end 14 of the pouch 12 from a remainder of the pouch 12 when the upper end 14 is extended into the housing 26. The blade 38 is positioned on an interior surface 40 of the first wall 28 wherein a point 42 of the blade 38 is movable toward an inside surface 44 of the second wall 30 when a hand 46 of the user 20 compresses the first wall 28 to cut the pouch 12 between the blade 38 and the second wall 30. The point 42 of the blade 38 moves away from the second wall 30 when the hand 46 of the user 20 is removed from the first wall 28 thereafter.

A receptacle 48 is removably coupled to the housing 26 and receives the upper end 14 of the pouch 12 when the upper end 14 is severed from the pouch 12. The receptacle 48 includes a bottom wall 50 and a perimeter wall 52 is coupled to and extending upwardly from the bottom wall 50. An upper edge 54 of the perimeter wall 52 is removably attached to the bottom end 36 of the housing 26. The upper edge 54 normally has an interior lip 56 being abuttable to an exterior lip 58 of the bottom end 36 of the housing 26. The receptacle 48 is removably retained in a fixed position to the bottom end 36 by friction force from the interior lip 56 abutting the exterior lip 58.

A mount 60 is coupled to the housing 26 and is removably mountable to the exterior of the refrigerated container 22. The mount 60 is typically coupled to an outside surface 62 of the second wall 30. The mount 60 may be coupled to an outer surface of the receptacle 48 to facilitate positioning the receptacle 48 adjacent to the bottom end 36 of the housing 26. The mount 60 normally comprises a magnet wherein the mount 60 is engaged by magnetism to the exterior of the refrigerated container 22 assuming the exterior is metallic or is engageable by magnetism.

In use, the housing 26 is mounted to the exterior of the refrigerated container 22. The receptacle 48 is removably coupled to the bottom end 36 of the housing 26. The user 20 may remove the pouch 12 from the refrigerated container 22 and insert the upper end 14 of the pouch 12 into the top end 34 of the housing 26 until the upper end 14 is positioned adjacent to the point 42 of the blade 38. The hand 46 of the user 20 compresses the first wall 28 to move the point 42 of the blade 38 towards the second wall 30 such that the upper end 14 of the pouch 12 is positioned between the point 42 and the inside surface 44 of the second wall 30. The point 42 of the blade 38 severs the upper end 14 of the pouch 12 which falls through the bottom end 36 of the housing 26 into the receptacle 48 for discarding as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A frozen liquid container opening system comprising:

a pouch being elongated and having an upper end and a lower end, said pouch having a frozen liquid therein, said pouch being sealed to retain the frozen liquid therein;

an opener being engagable by a user to facilitate opening said upper end of said pouch; and a mount being coupled to said housing and being removably mountable to the exterior of a refrigerated container;

said opener having a housing including a first wall, a second wall, and a pair of side walls, said first and second walls being coupled to said side walls and being positioned perpendicular relative to said side walls, wherein said housing forms a rectangular shape, said housing having a top end and a bottom end, said first wall being continuous between said side walls, said top end and said bottom end;

a blade being mounted within said housing to sever said upper end of said pouch from a remainder of said pouch when said upper end is extended into said housing, said blade being positioned on an interior surface of said first wall, wherein a point of said blade is movable toward an inside surface of said second wall by resilient deformation of said first wall; and said housing comprising a resiliently flexible material such that said first wall is configured to be resiliently deformed by application of force to said first wall thereby urging said blade towards said second wall.

2. The frozen liquid container opening system of claim 1, wherein said resiliently flexible material is an elastomeric material.

3. The frozen liquid container opening system of claim 1, further including a receptacle being removably coupled to said housing and receiving the upper end of the pouch when the upper end is severed from the pouch, said receptacle including a bottom wall and a perimeter wall being coupled to and extending upwardly from said bottom wall, an upper edge of said perimeter wall being removably attached to said bottom end of said housing.

4. The frozen liquid container opening system of claim 1, wherein said mount is coupled to an outside surface of said second wall.

5. The frozen liquid container opening system of claim 1, wherein said mount comprises a magnet.

6. A frozen liquid container opening system comprising:

a pouch being elongated and having an upper end and a lower end, said pouch having a frozen liquid therein, said pouch being sealed to retain the frozen liquid therein;

an opener being engagable by a user to facilitate opening said upper end of said pouch, said opener including:

a housing including a first wall, a second wall, and a pair of side walls, said first and second walls being coupled to said side walls and being positioned perpendicular relative to said side walls, wherein said housing forms a rectangular shape, said housing having a top end and a bottom end, said first wall being continuous between said side walls, said top end and said bottom end;

a blade being mounted within said housing to sever said upper end of said pouch from a remainder of said pouch when said top end is extended into said housing, said blade being positioned on an interior surface of said first wall, wherein a point of said blade is movable toward an inside surface of said second wall when a hand of the user compresses said first wall to cut the pouch between the blade and the second wall;

a receptacle being removably coupled to said housing and receiving the upper end of the pouch when the upper end is severed from the pouch, said receptacle including a bottom wall and a perimeter wall being coupled to and extending upwardly from said bottom wall, an upper edge of said perimeter wall being removably attached to said bottom end of said housing;

a mount being coupled to said housing and being removably mountable to the exterior of a refrigerated container, said mount being coupled to an outside surface of said second wall, said mount comprising a magnet; and said housing comprising a resiliently flexible material such that said first wall is configured to be resiliently deformed by application of force to said first wall thereby urging said blade towards said second wall, said resiliently flexible material being an elastomeric material.

* * * * *